Aug. 18, 1964 J. T. BOUTWELL 3,144,827

BLANK CARTRIDGE

Filed Nov. 19, 1962

INVENTOR.
JOHN T. BOUTWELL
BY Lyon & Lyon
ATTORNEYS 3,144,827
Patented Aug. 18, 1964

3,144,827

BLANK CARTRIDGE

John T. Boutwell, 3523 Casitas Ave., Los Angeles, Calif.
Filed Nov. 19, 1962, Ser. No. 238,665
8 Claims. (Cl. 102—39)

The present invention relates to explosive blank cartridges. More particularly, the present invention relates to a blank cartridge having a particular configuration and to a blank cartridge comprising a particular material. In addition, the present invention relates to the combination of a particular configuration and a particular material.

In general, the cartridge of the present invention comprises a synthetic plastic material which is very strong, flexible, fire and moisture resistant, stable at high temperatures and hard, but not brittle. Furthermore, this material has a high dielectric coefficient which substantially prevents the accumulation of static electricity on the cartridge. The configuration of the cartridge of the present inevntion is such that it eliminates the necessity for wadding or the like and thus eliminates the possibility of the discharge of disintegrated particles when the cartridge is fired.

It is an object of the present invention to provide a novel and improved blank cartridge.

It is another object of the present invention to provide a cartridge having a configuration which substantially prevents the discharge of particles when the cartridge is fired.

It is a further object of the present invention to provide a cartridge comprising a flexible, strong cartridge comprising a thermoplastic prepared from granules which granules comprise glass filaments.

Other objects and advantages of the present invention, it is believed, will be apparent from the following description when read in conjunction with the drawing.

Briefly, the present invention comprises a cartridge having a case prepared from a thermoplastic material comprising elongated granules of approximately $\frac{1}{16}$ to $\frac{1}{8}$ inch in diameter and having therein from about 15–60% by weight of the granules of generally parallel glass filaments extending longitudinally of the granule. The present invention also comprises a cartridge case having relatively thick walls and a closed end having a relatively thin wall and an open end provided with a locking groove. The present invention further comprises a cartridge head provided with a locking ridge which is adapted to engage the locking groove in the case. The present invention still further comprises the combination of this configuration with the previously described thermoplastic material.

Figure 1:
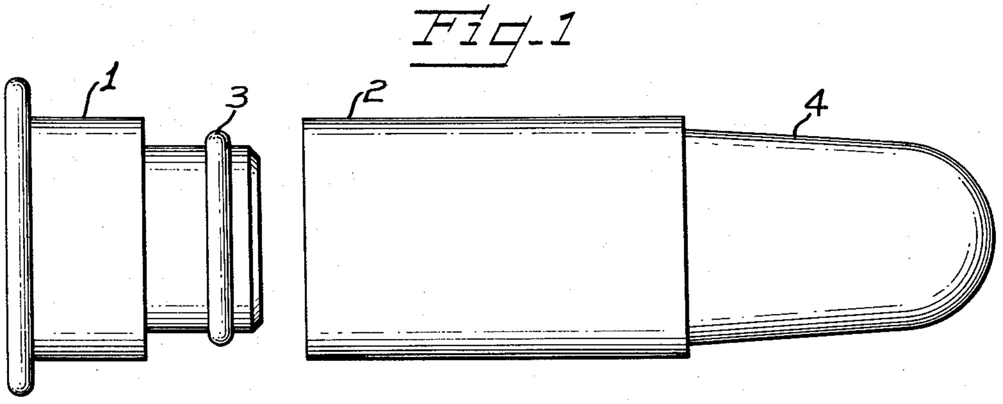
FIGURE 1 is a plan view of the cartridge of the present invention as it appears when it is not assembled.

The principal elements of the cartridge of the present invention, as illustrated in FIGURE 1, are head 1 and case 2. Head 1 is provided with locking ridge 3 while case 2 is provided with sloping portion 4.

Figure 2:
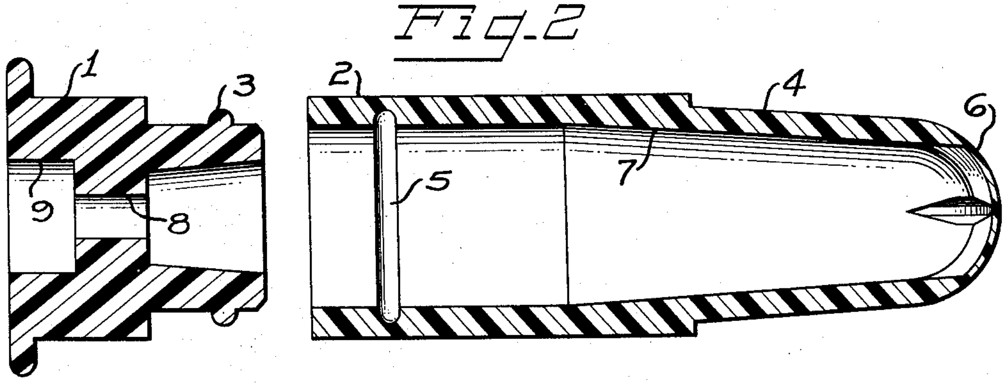
FIGURE 2 illustrates the cartridge of FIGURE 1 in longitudinal cross-sections.
Figure 3:
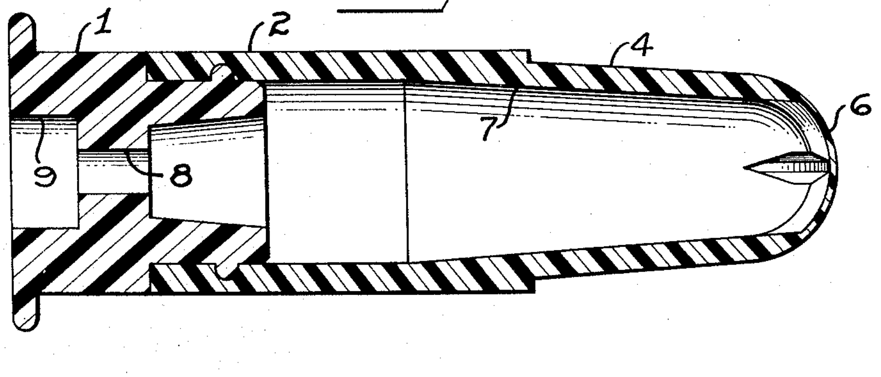
FIGURE 3 illustrates the assembled cartridge of the present invention in longitudinal cross-section.

As shown in FIGURE 2, case 2 is also provided with locking groove 5 and end wall 6 which has a thickness less than that of side wall 7. Head 1 is provided with flash hole 8 and primer pocket 9. FIGURE 3 illustrates these same elements as they appear when the cartridge is assembled. This cartridge may be filled with any suitable powder, e.g., double base powder.

One of the significant features of the cartridge of the present invention is relatively thin end wall 6 which is, of course, the point of least resistance in the cartridge. This thin wall permits molding of the cartridge in one piece and eliminates the need of wadding and sealant. When the cartridge is fired, end wall 6 simply spreads apart with the result that substantially no particles of casing are discharged through the barrel of the weapon. The size of the casing is dependent upon the calibre of the weapon with which it is designed to be used. However, it has been found that, in general, the thickness of end wall 6 may be about 0.005 inch to about 0.020 inch and that the thickness of side wall 7 may be about 0.030 inch to about 0.050 inch.

As illustrated in FIGURE 3, ridge 3 and groove 5 are adapted to engage each other. Thus, locking ridge 3 and locking groove 5 eliminate the need for solder or other bonding material which is conventionally used in cartridges. Case 2 is made from thermoplastic material while head 1 may be made of virtually any plastic material or metal such as brass or aluminum which possesses the necessary strength.

According to the preferred embodiment of the present invention, case 2 is made from a molding compound comprising elongated granules of approximately $\frac{1}{16}$ to $\frac{1}{8}$ inch in diameter and having therein from about 15–60% by weight of the granules of generally parallel glass filaments extending longitudinally of the granule, said filaments being coated with a polymerized sizing compound and a superjacent thermoplastic molding composition. This case has high dimensional stability, high modulus of elasticity, high resistance to distortion by heat, high tensile strength, unusually high impact strength and low shrinkage during curing. It has been found that glass fibers consisting of about 240 filaments to a strand, and having a weight of about 15,000 yards per pound are suitable in practicing the present invention. Roving or strands of this nature may be opened up for the necessary sizing and for the subsequent impregnation with molding plastic so that a uniform composition is obtained which is not subject to filtering out of the glass filler in the course of the molding operation. Diced glass mat and similar materials which do not provide a selected fiber length and which cannot be opened up for impregnation by sizing and molding compounds are not satisfactory, and when used produce a molded article of inferor character. It has been found that for general use, a fiber length from about $\frac{1}{4}$ to about 1 inch, depending upon the resistance to impact which is desired, may be employed. The case molded from this composition is believed to comprise distributed bundles of filaments, each bundle comprising generally parallel filaments.

Each filament in the threads or roving contained in the case composition is uniformly sized with a polymerizable composition, such as a polyvinyl acetate, which is compatible with the superjacent plastic molding composition employed. It has been found that the content of the glass in the granules is preferably maintained between about 15–60% by weight, in order to obtain the desired properties. The thermoplastic which is preferred for use in the practice of the present invention is nylon, i.e., polyamides. However, other similar polymers may be used. Especially preferred for use in the present invention is Nylafil G3, type 6 (manufactured by Fiberfil, Incorporated). This material has a tensile strength at 73° F. of 21,950 p.s.i., and impact strength (Izod, 73° F., $\frac{1}{2}$ inch x $\frac{1}{4}$ inch bars) of 3.6 foot pounds per inch, and a heat distortion temperature of about 420° F.

In the most preferred embodiment of the present invention, head 1 is prepared from a molding composition comprising elongated granules of approximately $\frac{1}{16}$ to $\frac{1}{8}$ inch in diameter having therein from about 15–60% by weight of the granule of generally parallel glass filaments extending longitudinally of the granule, the filaments being coated with a polymerized sizing compound and a superjacent thermoplastic molding composition.

It will be apparent to those skilled in the art that the present invention has many advantages over prior art cartridges. The configuration of the cartridge of the present invention with the important features of a thin case end wall and the locking groove-locking ridge arrangement results in a cartridge which is easy to assemble and which consistently performs satisfactorily. The many advantages of the preferred cartridge case composition of the present invention have been described in some detail. It will also be apparent to those skilled in the art that the specific embodiments described herein may be modified without departing from the scope of the present invention. For example, the cartridge of the present invention may be used for live ammunition as well as blank cartridges.

Having fully described the present invention, it is to be understood that it is not to be limited to the details set forth, but it is of the full scope of the appended claims.

I claim:

1. A cartridge case comprising a molded thermoplastic prepared from a molding composition comprising elongated granules of approximately 1/16 to about 1/8 inch in diameter and having therein from about 15–60% by weight of the granule of generally parallel short-length filaments extending longitudinally of the granule, said filaments being coated with a polymerized sizing compound and a superjacent thermoplastic molding composition.

2. A cartridge case comprising a theromplastic material prepared from a molding composition comprising elongated granules of approximately 1/16 to about 1/8 inch in diameter and having therein from about 15–60% by weight of the granule of generally parallel short-length glass filaments extending longitudinally of the granule, said filaments being coated with a polymerized sizing compound and a superjacent polyamide.

3. The cartridge case of claim 2 wherein said sizing compound comprises polyvinyl acetate.

4. A cartridge case comprising a thermoplastic material, said material comprising a polyamide containing from about 15–60% by weight of bundles of generally parallel short-length glass filaments, said filaments being coated with a polymerized sizing compound.

5. The cartridge case of claim 4 wherein said filaments have a length of about 1/4 to about 1 inch.

6. A cartridge comprising a head and a case; said case being substantially tubular, said case having a first end which is closed by an end wall, said end wall being relatively thin as compared with the side walls of said case, a second end of said case being provided with a locking groove; said case being prepared from a molding composition comprising elongated granules of approximately 1/16 to about 1/8 inch in diameter and having therein from about 15–60% by weight of the granule of generally parallel short-length glass filaments extending longitudinally of the granule, said filaments being coated with a polymerized sizing compound and a superjacent thermoplastic molding composition; and said head being provided with a locking ridge adapted to engage said locking groove.

7. A cartridge comprising a head and a case; said case being substantially tubular, said case having a first end closed by an end wall, said end wall being relatively thin as compared with the side walls of the case, the second end of said case being provided with a locking groove, said case being prepared from a molding composition comprising elongated granules of approximately 1/16 to 1/8 inch in diameter and having therein from about 15–60% by weight of the granule of generally parallel short-length glass filaments extending longitudinally of the granule, said filaments being coated with a polymerized sizing compound and a superjacent polyamide; said head being provided with a locking ridge adapted to engage said locking groove.

8. The cartridge of claim 7 wherein said filaments have a length of from about 1/4 to about 1 inch.

References Cited in the file of this patent

UNITED STATES PATENTS

| | | |
|---|---|---|
| 2,703,529 | Tuckerman et al. | Mar. 8, 1955 |
| 2,894,456 | Olin | July 14, 1959 |
| 2,953,990 | Miller | Sept. 27, 1960 |

FOREIGN PATENTS

| | | |
|---|---|---|
| 973,692 | France | Sept. 20, 1950 |
| 732,633 | Great Britain | June 29, 1955 |